United States Patent [19]
Murphy

[11] Patent Number: 5,667,236
[45] Date of Patent: Sep. 16, 1997

[54] SAFETY CONTROL GRIP BRAKE FOR WHEELCHAIRS

[76] Inventor: Michael K. Murphy, 1001 E. Elizabeth, Olathe, Kans. 66061

[21] Appl. No.: 511,285

[22] Filed: Aug. 4, 1995

[51] Int. Cl.⁶ .................................................. B60T 1/04
[52] U.S. Cl. ........................... 280/304.1; 188/2 F
[58] Field of Search ................ 280/304.1, 250.1; 297/DIG. 4; 188/24.11, 24.18, 24.21, 24.22, 2 F

[56] References Cited

U.S. PATENT DOCUMENTS

| | | | |
|---|---|---|---|
| 3,529,700 | 9/1970 | Marshall | 188/2 F |
| 4,204,588 | 5/1980 | Kawecki | 188/2 F |
| 4,232,565 | 11/1980 | Leonheart | 74/551.9 X |
| 4,852,697 | 8/1989 | Kulik | 280/304.1 X |
| 5,141,242 | 8/1992 | Henzel | 280/304.1 |
| 5,280,938 | 1/1994 | Berry | 280/304.1 |
| 5,346,039 | 9/1994 | Pfisterer | 188/2 F |
| 5,358,266 | 10/1994 | Roth et al. | 280/304.1 |

*Primary Examiner*—Kevin Hurley

[57] ABSTRACT

A safety control grip brake for wheelchairs comprised of an internal steel sleeve adapted for rotatable coupling with an existing handle of a wheelchair. A steel spring coil is coupled with the internal steel sleeve. The steel spring coil applies a clockwise/counter clockwise tension on the internal steel sleeve. An outer hand grip is adapted for securement over the internal steel sleeve. The first end of the outer hand grip couples with the second end of the steel spring coil, and the second end of the outer hand grip is connected to a flanged pulley. The center bearing of the flanged pulley is secured to the internal steel sleeve. A steel cable is secured to the flanged pulley and extends down a frame of the wheelchair and is secured thereto by brackets. A brake mechanism is secured to the steel cable and couples with a wheel of the wheelchair to limit or stop the rotation of the wheel.

5 Claims, 5 Drawing Sheets

SAFETY CONTROL GRIP BRAKE FOR WHEELCHAIRS

BACKGROUND OF THE INVENTION

1. Field of the Invention

The present invention relates to a safety control grip brake for wheelchairs and more particularly pertains to providing a mechanical braking device for a wheelchair that gives a user better control with a safety control grip brake for wheelchairs.

2. Description of the Prior Art

The use of wheelchair brakes is known in the prior art. More specifically, wheelchair brakes heretofore devised and utilized for the purpose of making locking contact with a wheelchair wheel are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,280,938 to Berry discloses a wheelchair brake.

U.S. Pat. No. 5,263,729 to Watwood et al. discloses a wheelchair driver and braking system.

U.S. Pat. No. 4,987,978 to Jungersen discloses a wheelchair safety brakes.

U.S. Pat. No. 4,852,697 to Kulik discloses wheelchair handbrakes with actuator tube and replaceable brake stopper.

U.S. Pat. No. 4,271,933 to Pearde et al. discloses a wheelchair brake attachment.

While these devices fulfill their respective, particular objective and requirements, the aforementioned patents do not describe a safety control grip brake for wheelchairs for providing a mechanical braking device for a wheelchair that gives a user better control.

In this respect, the safety control grip brake for wheelchairs according to the present invention substantially departs from the conventional concepts and designs of the prior art, and in doing so provides an apparatus primarily developed for the purpose of providing a mechanical braking device for a wheelchair that gives a user better control.

Therefore, it can be appreciated that there exists a continuing need for new and improved safety control grip brake for wheelchairs which can be used for providing a mechanical braking device for a wheelchair that gives a user better control. In this regard, the present invention substantially fulfills this need.

SUMMARY OF THE INVENTION

In the view of the foregoing disadvantages inherent in the known types of wheelchair brakes now present in the prior art, the present invention provides an improved safety control grip brake for wheelchairs. As such, the general purpose of the present invention, which will be described subsequently in greater detail, is to provide a new and improved safety control grip brake for wheelchairs and method which has all the advantages of the prior art and none of the disadvantages.

To attain this, the present invention essentially comprises an internal steel sleeve having a first end and a second end. The internal steel sleeve is adapted for rotatable coupling with an existing handle of a wheelchair. The second end has a protrusion extending outwardly therefrom. The device contains a steel spring coil having a first end, a second end, and an intermediate circular portion therebetween. The first end is coupled with the protrusion of the internal steel sleeve. The steel spring coil applies a clockwise/counter clockwise tension on the internal steel sleeve. The device contains an outer hand grip adapted for securement over the internal steel sleeve. The first end of the outer hand grip couples with the second end of the steel spring coil, and the second end of the outer hand grip is connected to a flanged pulley. The center bearing of the flanged pulley is secured to the internal steel sleeve. The flanged pulley has an outer housing secured thereover to the first end of the internal steel sleeve. The outer housing has an aperture formed through a lower portion thereof. The device contains a steel cable having a first end, a second end, and an intermediate extent therebetween. The first end is secured to the flanged pulley. The intermediate extent extends outwardly of the aperture in the outer housing and extends down a frame of the wheelchair and secured thereto by brackets. The device contains a double arm adjustable brake having a first end, a second end, and an intermediate extent therebetween. The first end is secured to the second end of the steel cable. The intermediate extent is pivotally secured to the frame of the wheelchair adjacent to a wheel and an axle thereof. The second end has a brake pad disposed thereon. The device contains a steel brake plate coupled with the axle of the wheelchair adjacent to the wheel thereof. The steel brake plate biases towards the wheel when pressured by the second end of the double arm adjustable brake to limit or stop the rotation of the wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety control grip brake for wheelchairs which has all the advantages of the prior art wheelchair brakes and none of the disadvantages.

It is another object of the present invention to provide a new and improved safety control grip brake for wheelchairs which may be easily and efficiently manufactured and marketed.

It is a further object of the present invention to provide a new and improved safety control grip brake for wheelchairs which is of durable and reliable construction.

An even further object of the present invention is to provide a new and improved safety control grip brake for wheelchairs which is susceptible of a low cost of manufacture with regard to both materials and labor, and which accordingly is then susceptible of low prices of sale to the consuming public, thereby making such a safety control grip brake for wheelchairs economically available to the buying public.

Still yet another object of the present invention is to provide a new and improved safety control grip brake for wheelchairs which provides in the apparatuses and methods of the prior art some of the advantages thereof, while simultaneously overcoming some of the disadvantages normally associated therewith.

Even still another object of the present invention is to provide a new and improved safety control grip brake for wheelchairs for providing a mechanical braking device for a wheelchair that gives a user better control.

Lastly, it is an object of the present invention to provide a new and improved safety control grip brake for wheelchairs comprised of an internal steel sleeve adapted for rotatable coupling with an existing handle of a wheelchair. A steel spring coil is coupled with the internal steel sleeve. The steel spring coil applies a clockwise/counter clockwise tension on the internal steel sleeve. An outer hand grip is adapted for securement over the internal steel sleeve. The first end of the outer hand grip couples with the second end of the steel spring coil, and the second end of the outer hand grip is connected to a flanged pulley. The center bearing of the flanged pulley is secured to the internal steel sleeve. A steel cable is secured to the flanged pulley and extends down a frame of the wheelchair and is secured thereto by brackets. A brake mechanism is secured to the steel cable and couples with a wheel of the wheelchair to limit or stop the rotation of the wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
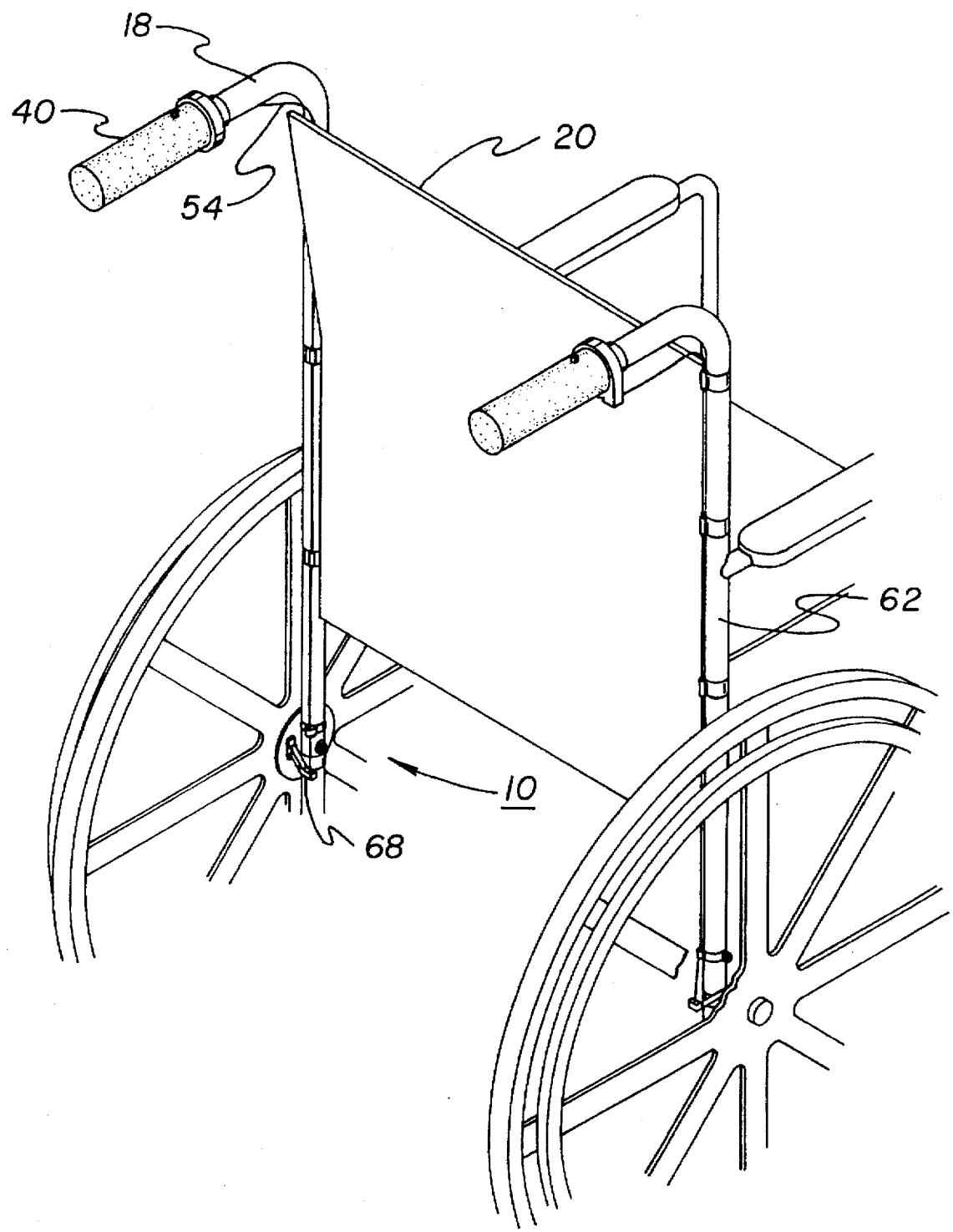
FIG. 1 is a perspective view of the preferred embodiment of the safety control grip brake for wheelchairs constructed in accordance with the principles of the present invention.
Figure 2:
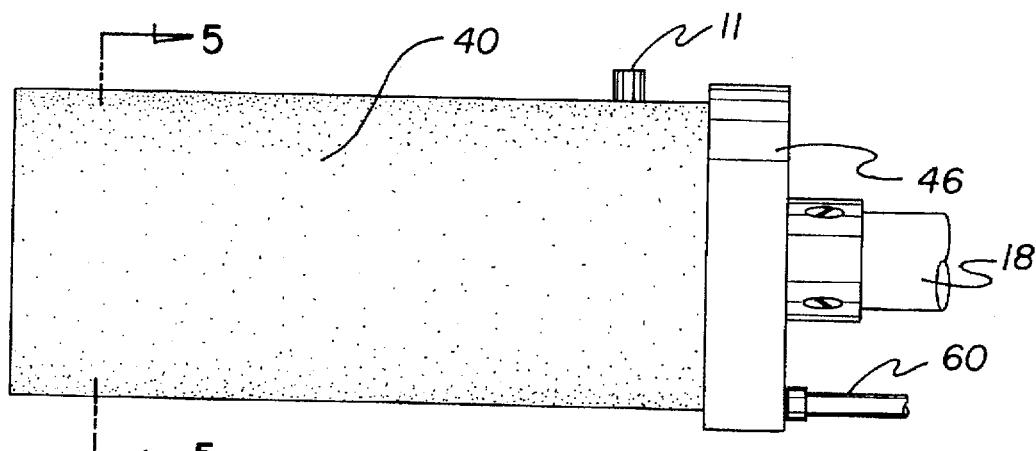
FIG. 2 is a side view of the outer grip of the present invention.
Figure 3:
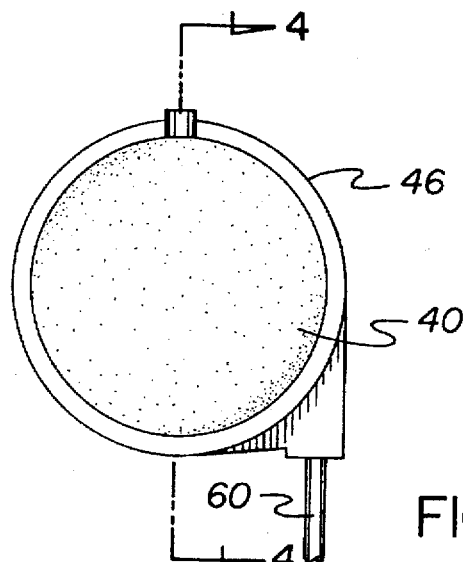
FIG. 3 is a rear view of outer grip of the present invention.
Figure 4:
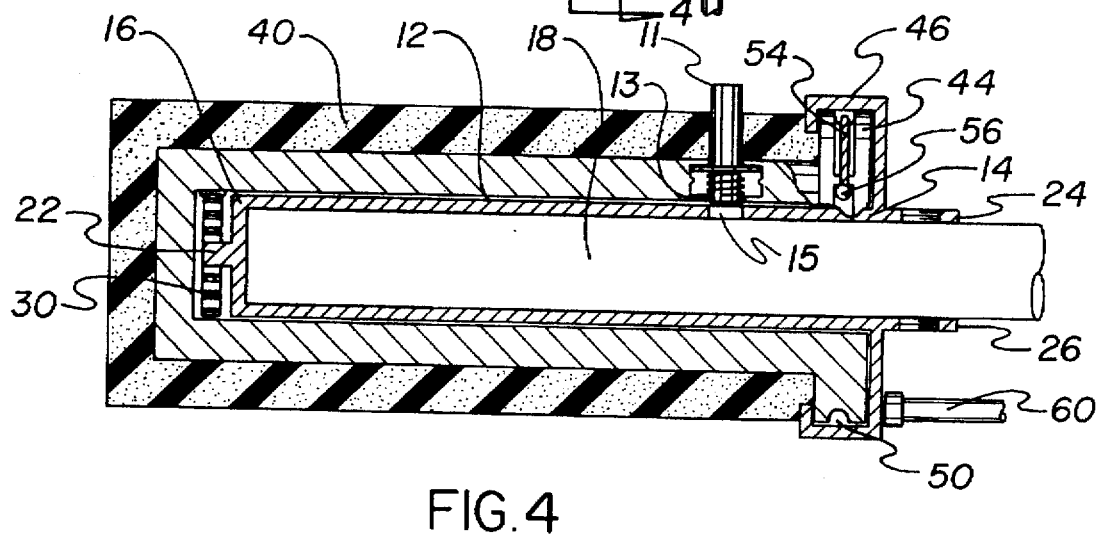
FIG. 4 is a cross-sectional view as taken along line 4—4 of FIG. 3.
Figure 5:
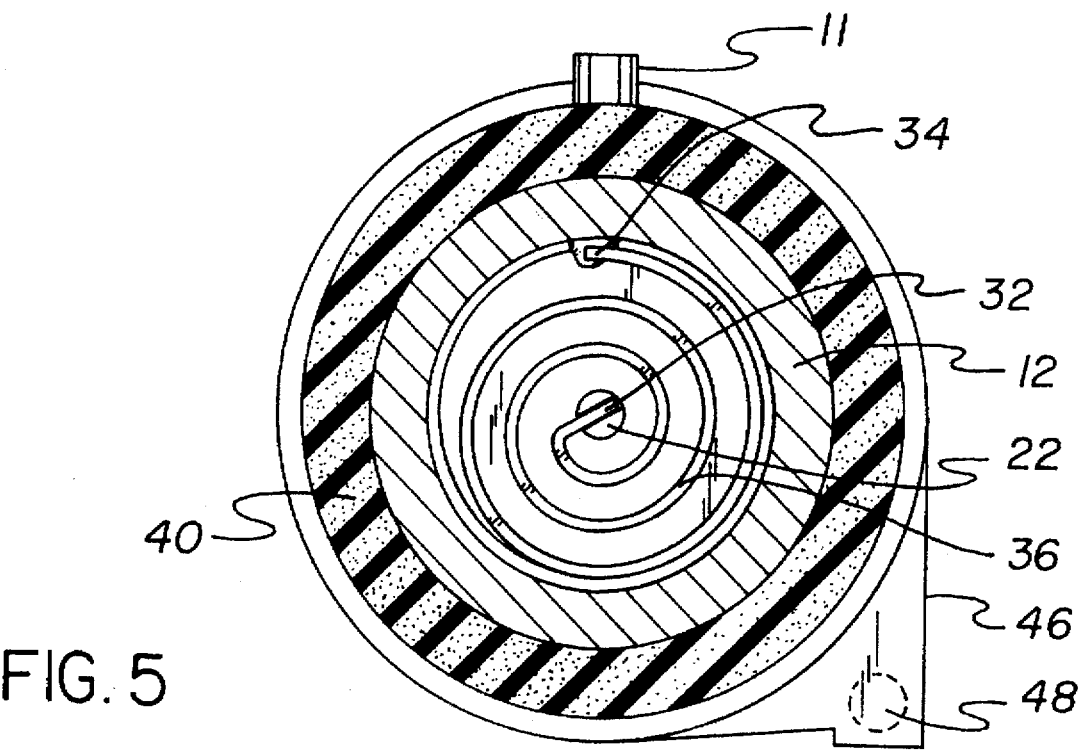
FIG. 5 is a cross-sectional view as taken along line 5—5 of FIG. 2.
Figure 6:
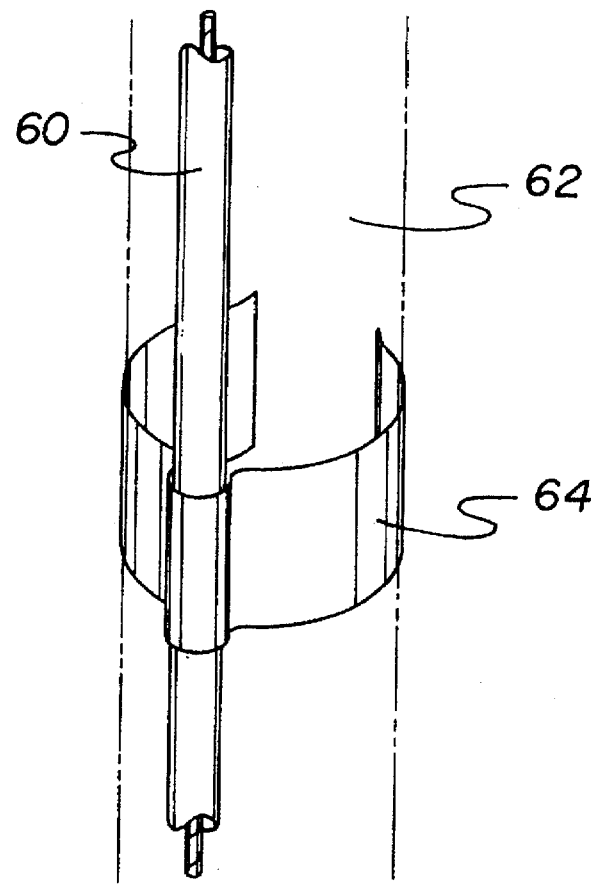
FIG. 6 is a front view of the steel cable coupled to the wheelchair shaft.
Figure 7:
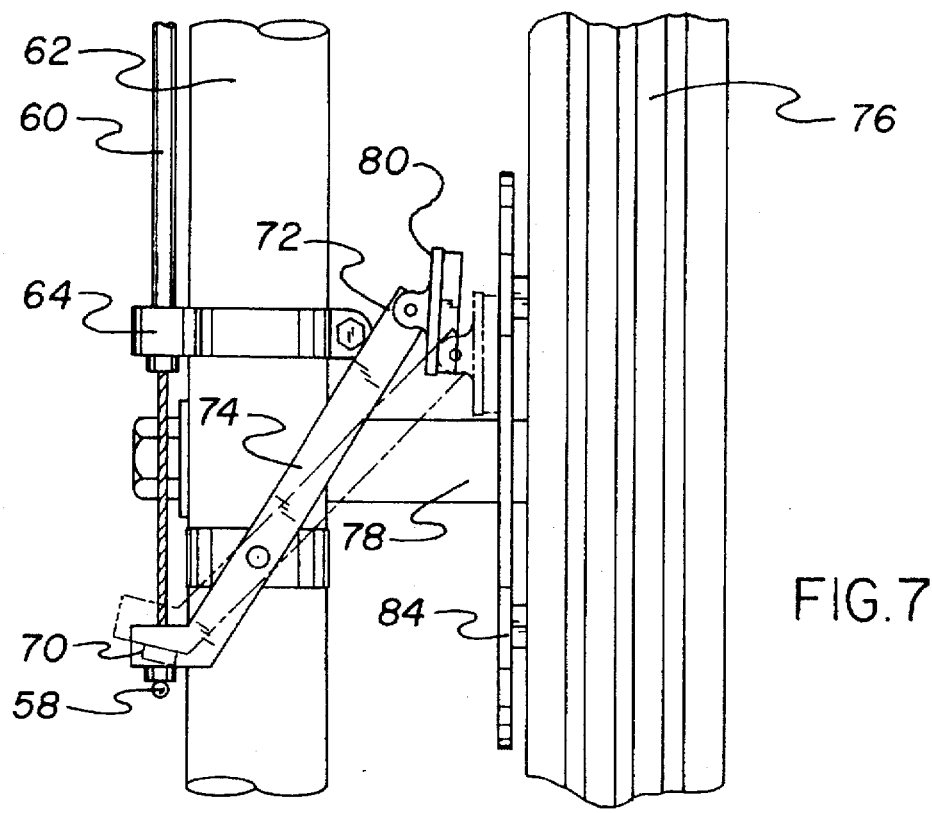
FIG. 7 is a front view of the adjustable brake of the present invention.
Figure 8:
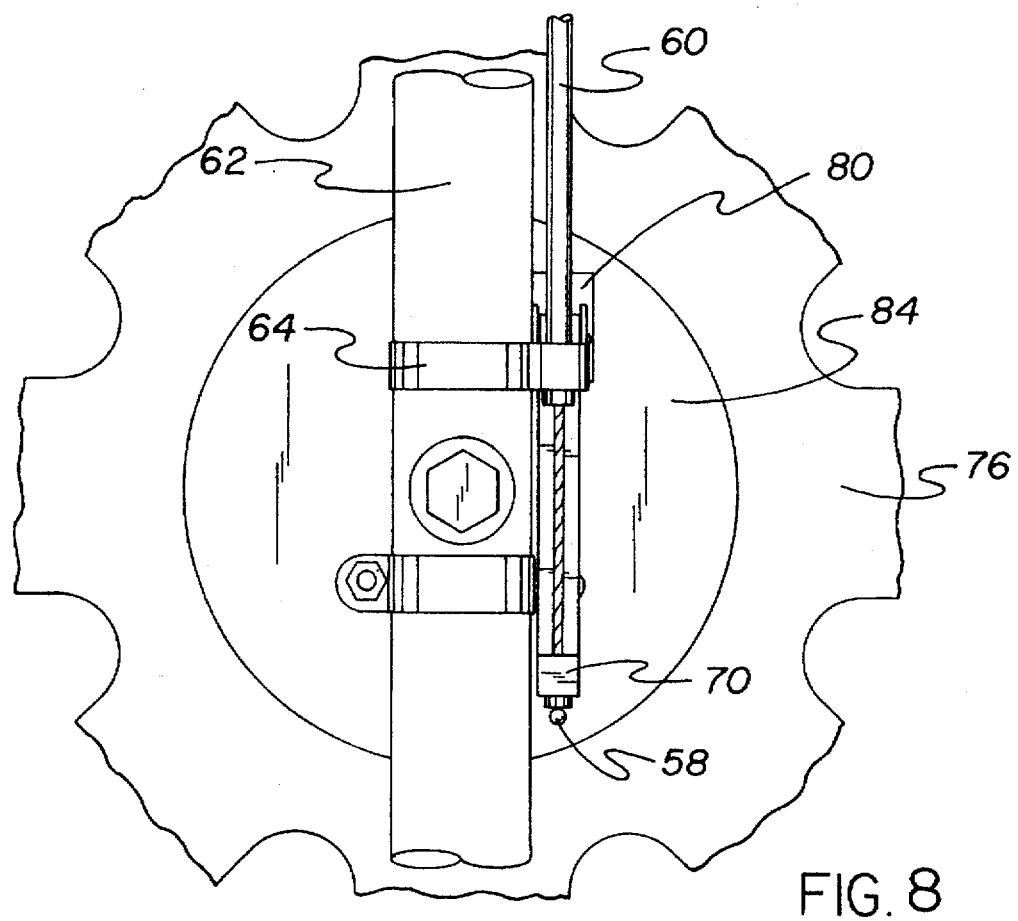
FIG. 8 is a side view of the adjustable brake of the present invention.

With reference now to the drawings, and in particular, to FIGS. 1–9 thereof, the preferred embodiment of the new and improved safety control grip brake for wheelchairs embodying the principles and concepts of the present invention and generally designated by the reference number 10 will be described.

Specifically, it will be noted in the various Figures that the device relates to a new and improved safety control grip brake for wheelchairs for providing a mechanical braking device for a wheelchair that gives a user better control. In its broadest context, the device consists of an internal steel sleeve, a steel spring coil, an outer hand grip, a flanged pulley, a steel cable, a double arm adjustable brake, and a steel brake plate.

The device 10 contains an internal steel sleeve 12 having a first end 14 and a second end 16. The internal steel sleeve 12 is adapted for rotatable coupling with an existing handle 18 of a wheelchair 20. The second end 16 has a protrusion 22 extending outwardly therefrom. The internal steel sleeve 12 is secured to the handle 18 of the wheelchair 20 by a recessed bolt 24 through an exterior end portion 26 thereof. The exterior end portion 26 is the only component that is secured to the handle 18 of the wheelchair 20 thereby allowing the internal steel sleeve free rotational ability.

The device contains a steel spring coil 30 having a first end 32, a second end 34, and an intermediate circular portion 36 therebetween. The first end 32 is coupled with the protrusion 22 of the internal steel sleeve 12. The steel spring coil 30 applies a clockwise/counter clockwise tension on the internal steel sleeve 12. When a user turns the outer hand grip 40, the steel spring coil 30 biases the sleeve 12 in the opposing direction, or in this instance, clockwise. This direction would be dependent on whether the user was turning the right or left outer hand grip 40.

The device 10 contains an outer hand grip 40 adapted for securement over the internal steel sleeve 12. The outer hand grip 40 is preferably fabricated of a foam rubber or other suitable material resistant to everyday wear and tear. The outer hand 40 grip couples with the second end 34 of the steel spring coil 34. The outer hand grip 40 is gripped by a user who turn it in a counter-clockwise/clockwise fashion which in turn will rotate the flanged pulley 44.

The device 10 contains a spring-biased push button locking mechanism 11 secured to the outer hand grip 40. The spring-biased push button locking mechanism 11 has an end portion 13 extending inwardly through the outer hand grip 40 to engage an aperture 15 formed within the steel sleeve 12 thereby allowing the user to lock the outer hand grip 40 in place.

The device 10 contains a flanged pulley 44 adapted for rotatable coupling with the existing handle 18 of the wheelchair 20. The flanged pulley 44 is connected to the second end of the outer hand grip 40. The center bearing of the flanged pulley is secured to the second end 14 of the internal steel sleeve 12. The flanged pulley 44 has an outer housing 46 secured thereover to the first end 14 of the internal steel sleeve 12. The outer housing 46 has an aperture 48 formed through a lower portion thereof. The flanged pulley 44 is circular in shape with a recess 50 through a middle portion thereof.

The device 10 contains a steel cable 54 having a first end 56, a second end 58, and an intermediate extent 60 therebetween. The first end 56 is secured to the flanged pulley 44. The first end 56 is secured within the recess 50 within the flanged pulley. The first end 56 has a steel ball thereon to prevent the first end from becoming dislodged from the flanged pulley 44. The intermediate extent 60 extends outwardly of the aperture 48 in the outer housing 46 and extends down a frame 62 of the wheelchair 20 and secured thereto by brackets 64. The steel cable 54 has a soft plastic sheath covering its entire surface save the first 56 and second ends 58. The soft plastic sheath serves to protect users from being cut or scratched by the steel cable 54.

The device 10 contains a double arm adjustable brake 68 having a first end 70, a second end 72, and an intermediate extent 74 therebetween. The first end 70 is secured to the second end 58 of the steel cable 54. The intermediate extent 74 is pivotally secured to the frame 62 of the wheelchair 20 adjacent to a wheel 76 and an axle 78 thereof. The second end 72 has a brake pad 80 disposed thereon.

The device 10 contains a steel brake plate 84 coupled with the axle 78 of the wheelchair 20 adjacent to the wheel 76 thereof. The steel brake plate 84 biases towards the wheel 76 when pressured by the second end 72 of the double arm adjustable brake 68 to limit or stop the rotation of the wheel 76. When a user decides to stop the wheelchair 20, he/she turns the outer hand grip 40 inward (clockwise/counter clockwise direction). This will cause the flanged pulley 44 to turn pulling the steel cable 54 around the recess 50 in the flanged pulley 44 thereby pulling the first end 70 of the double adjustable brake 68 up causing the second end 72 to engage the steel brake plate 84 to cause the wheel 76 to stop rotating and stopping the wheelchair 20. Pushing inward on the spring-biased locking mechanism 11 will engage the end 13 to an aperture 15 allowing the user to lock the outer hand grip 40 in place. Each wheelchair 20 will be equipped with a device for each of its two wheels and two handles.

Figure 9:
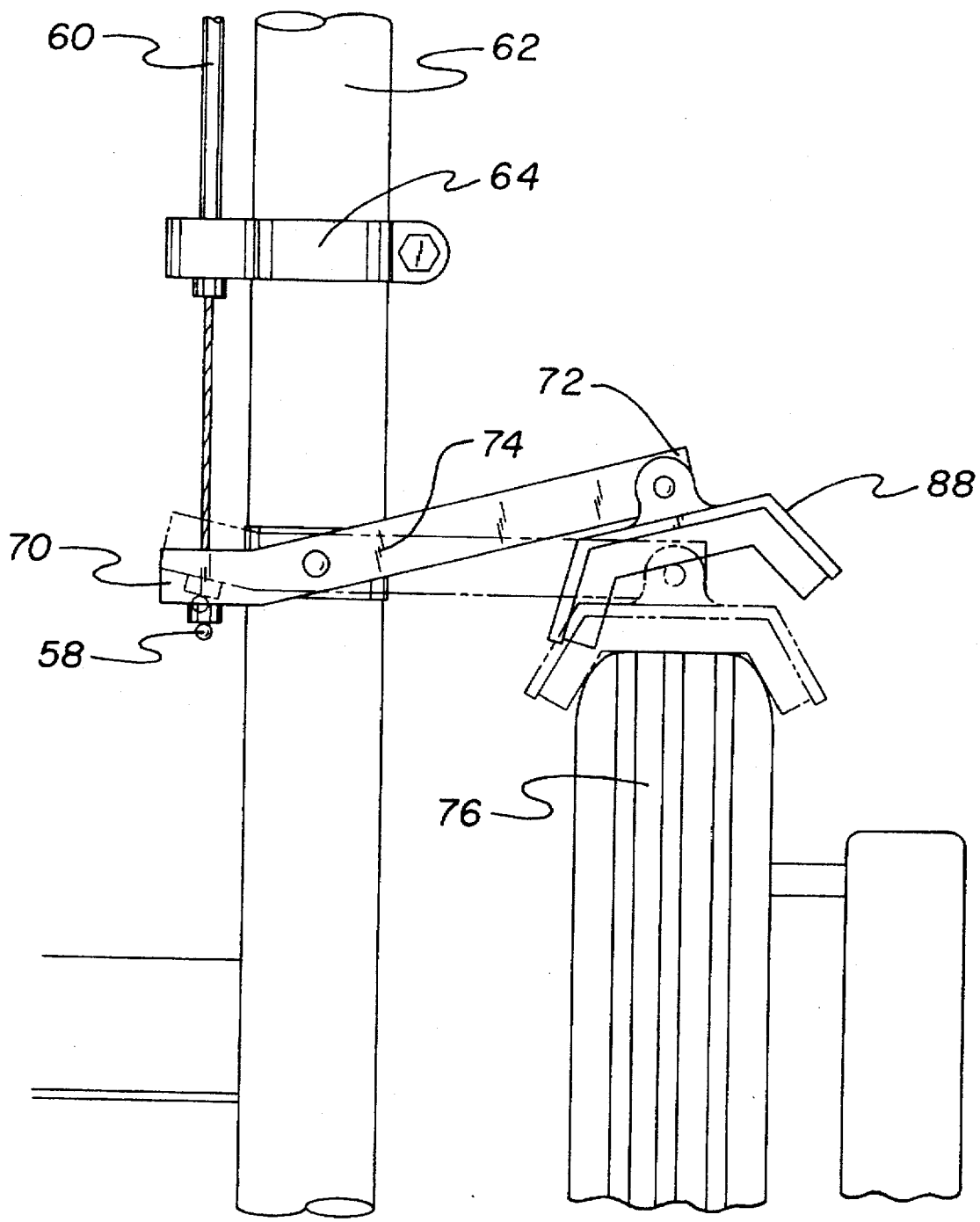
FIG. 9 is a front view of a second embodiment of the present invention.

A second embodiment of the present invention is shown in FIG. 9 and includes substantially all of the components of the present invention further including where the double arm adjustable brake 68 has a first end 70, a second end 72, and an intermediate extent 74 therebetween. The first end 70 is secured to the second end 58 of the steel cable 54. The intermediate extent 74 is pivotally secured to the frame 62 of the wheelchair 20 adjacent to a top portion of a wheel 76 thereof. The second end 72 has a U-shaped brake pad 88 disposed thereon. The U-shaped brake pad 88 biases towards the top portion of the wheel 76 when pressured by the second end 72 of the double arm adjustable brake 68 to limit or stop the rotation of the wheel 76.

The device 10 consists of an outer hand grip 40, an internal steel sleeve 12, a steel coil spring 30, a flanged pulley 44, a steel cable 54, a soft plastic sheath, a double arm adjustable brake 68, and a steel brake plate 84. The padded handgrip 40 and the internal sleeve 12 are both cylindrical.

The internal sleeve 12 is adapted for rotatable coupling with the existing handle 18 of the wheelchair 20. The first end 32 of the steel spring coil 30 is coupled with the protrusion 22 of the second end internal steel sleeve 12. The steel spring coil 30 applies a clockwise/counter clockwise tension on the internal steel sleeve 12. The device contains an outer hand grip 40 adapted for securement over the internal sleeve 12. The first end of the outer hand grip 40 couples with the second end 34 of the steel spring coil 30, and the second end of the outer hand grip 40 is connected to a flanged pulley 44. The center bearing of the flanged pulley 44 is secured to the internal steel sleeve 12. One end of the cable 54 is attached to the pulley 44 and continues through a length of plastic sheath secured to a wheelchair frame 62 and down to the brake 68 mounted on the frame 62. The brake 68 is fastened on a pivot onto the frame 62 adjacent to the wheel 76. The U-shaped brake pad 88 biases towards the top portion of the wheel 76 when pressured by the second end 72 of the double arm adjustable brake 68.

Simply turn the hand grip 40 counterclockwise/clockwise. The cable 54 wraps around the pulley 44 and pulls up on the first end 70 of the brake arm 68, causing the second end 72 to bias the U-shaped brake pad 88 towards the top of the wheelchair 20 wheel 76 causing it to stop.

The device 10 provides improved braking for wheelchairs and security for their users. It can be added to existing wheelchairs or included at original manufacture.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A safety control grip brake in combination with a wheelchair of the type having a frame and a handle and an axle with a plurality of wheels for providing a mechanical braking device for the wheelchair that gives a user better control comprising, in combination:

an internal steel sleeve having a first end and a second end, the internal steel sleeve being adapted for rotatable coupling with the handle of the wheelchair, the second end having a protrusion extending outwardly therefrom;

a steel spring coil having a first end, a second end, and an intermediate circular portion therebetween, the first end coupled with the protrusion of the internal steel sleeve, the steel spring coil applying a clockwise/counter clockwise tension on the internal steel sleeve;

an outer hand grip adapted for securement over the internal steel sleeve, the outer hand grip coupling with the second end of the steel spring coil;

a spring-biased push button locking mechanism secured to the outer hand grip, the spring-biased push button locking mechanism having an end portion extending inwardly through the outer hand grip to engage an aperture formed within the steel sleeve thereby allowing the user to lock the outer hand grip in place;

a flanged pulley adapted for rotatable coupling with the handle of the wheelchair, the flanged pulley being connected to the second end of the outer hand grip, the enter bearing of the flanged pulley being secured to the second end of the internal steel sleeve, the flanged pulley having an outer housing secured thereover to the first end of the internal steel sleeve, the outer housing having an aperture formed through a lower portion thereof;

a steel cable having a first end, a second end, and an intermediate extent therebetween, the first end being secured to the flanged pulley, the intermediate extent extending outwardly of the aperture in the outer housing and extending down the frame of the wheelchair and secured thereto by brackets;

a double arm adjustable brake having a first end, a second end, and an intermediate extent therebetween, the first end secured to the second end of the steel cable, the intermediate extent being pivotally secured to the frame of the wheelchair adjacent to one wheel and the axle thereof, the second end having a brake pad disposed thereon; and a steel brake plate coupled with the axle of the wheelchair adjacent to the one wheel thereof, the steel brake plate biasing towards the wheel when pressured by the second end of the double arm adjustable brake to limit or stop the rotation of the wheel.

2. A safety control grip brake in combination with a wheelchair of the type having a frame and a handle and an axle with a plurality of wheels for providing a mechanical braking device for the wheelchair that gives a user better control comprising:

an internal steel sleeve adapted for rotatable coupling with an existing handle of the wheelchair;

a steel spring coil coupled with the internal steel sleeve, the steel spring coil applying a clockwise/counterclockwise tension on the internal steel sleeve;

an outer hand grip adapted for securement over the internal steel sleeve, the outer hand grip coupling with the second end of the steel spring coil;

a flanged pulley adapted for rotatable coupling with the handle of the wheelchair, the flanged pulley secured to the internal steel sleeve;

a steel cable secured to the flanged pulley and extending down a frame of the wheelchair and secured thereto by brackets; and a brake mechanism secured to the steel cable and coupling with one wheel of the wheelchair to limit or stop the rotation of the wheel.

3. The combination wheelchair of the type having a frame and a handle and an axle with a plurality of wheels as described in claim 2 wherein the brake mechanism comprises a double arm adjustable brake having a first end, a second end, and an intermediate extent therebetween, the first end secured to the steel cable, the intermediate extent being pivotally secured to the frame of the wheelchair adjacent to the wheel and an axle thereof, the second end having a brake pad disposed thereon, a steel brake plate coupled with the axle of the wheelchair adjacent to one wheel thereof, the steel brake plate biasing towards the wheel when pressured by the second end of the double arm adjustable brake to limit or stop the rotation of the one wheel.

4. The combination wheelchair of the type having a frame and a handle and an axle with a plurality of wheels as described in claim 2 wherein the brake mechanism comprises a double arm adjustable brake having a first end, a second end, and an intermediate extent therebetween, the first end secured to the steel cable, the intermediate extent being pivotally secured to the frame of the wheelchair adjacent to a top portion of a wheel thereof, the second end having a U-shaped brake pad disposed thereon, the U-shaped brake pad biasing towards the top portion of the wheel when pressured by the second end of the double arm adjustable brake to limit or stop the rotation of the one wheel.

5. The combination wheelchair of the type having a frame and a handle and an axle with a plurality of wheels as described in claim 2 and further including a spring-biased push-button locking mechanism secured to the outer hand grip, the spring-biased push-button locking mechanism having an end portion extending inwardly to engage an aperture formed within the internal steel sleeve.

* * * * *